(12) United States Patent
Malladi et al.

(10) Patent No.: US 8,135,785 B2
(45) Date of Patent: Mar. 13, 2012

(54) SYSTEM AND METHOD FOR PROCESSING MESSAGES USING PLUGGABLE PROTOCOL PROCESSORS IN A SERVICE-ORIENTED PIPELINE ARCHITECTURE

(75) Inventors: Sastry K. Malladi, Fremont, CA (US); Ronald Francis Murphy, Pleasanton, CA (US); Gary Yue, San Jose, CA (US)

(73) Assignee: eBay Inc., San Jose, CA (US)

( * ) Notice: Subject to any disclaimer, the term of this patent is extended or adjusted under 35 U.S.C. 154(b) by 97 days.

(21) Appl. No.: 12/242,639

(22) Filed: Sep. 30, 2008

(65) Prior Publication Data

US 2010/0082830 A1  Apr. 1, 2010

(51) Int. Cl.
 *G06F 15/16* (2006.01)
(52) U.S. Cl. .......... 709/206; 709/201; 709/230
(58) Field of Classification Search .......... 709/201, 709/206, 230
 See application file for complete search history.

(56) References Cited

U.S. PATENT DOCUMENTS

| 7,530,074 | B1* | 5/2009 | Snodgrass | 719/311 |
| 7,600,131 | B1* | 10/2009 | Krishna et al. | 713/192 |
| 7,631,107 | B2* | 12/2009 | Pandya | 709/250 |
| 7,694,140 | B1* | 4/2010 | Sachenko et al. | 713/170 |
| 2002/0174340 | A1* | 11/2002 | Dick et al. | 713/178 |
| 2005/0066197 | A1* | 3/2005 | Hirata et al. | 713/201 |
| 2005/0080873 | A1 | 4/2005 | Joseph | |
| 2005/0108518 | A1* | 5/2005 | Pandya | 713/151 |
| 2005/0223109 | A1 | 10/2005 | Mamou et al. | |
| 2005/0267947 | A1 | 12/2005 | Patrick et al. | |
| 2006/0129655 | A1 | 6/2006 | Schlimmer et al. | |
| 2006/0174016 | A1 | 8/2006 | Critchley et al. | |
| 2007/0011126 | A1 | 1/2007 | Conner et al. | |
| 2007/0168228 | A1 | 7/2007 | Lawless | |
| 2007/0174288 | A1 | 7/2007 | Stoyanova | |
| 2007/0250766 | A1 | 10/2007 | Medi et al. | |
| 2008/0049022 | A1 | 2/2008 | Sherb et al. | |
| 2009/0112902 | A1 | 4/2009 | Sthanikam et al. | |
| 2010/0082830 | A1* | 4/2010 | Malladi et al. | 709/230 |
| 2010/0083277 | A1* | 4/2010 | Malladi et al. | 719/313 |
| 2010/0083281 | A1* | 4/2010 | Malladi et al. | 719/317 |
| 2010/0169469 | A1 | 7/2010 | Malladi et al. | |

OTHER PUBLICATIONS

"U.S. Appl. No. 12/346,742, Non Final Office Action mailed Dec. 28, 2010", 13 pgs.
"U.S. Appl. No. 12/242,653, Non Final Office Action, mailed Sep. 16, 2011", 29 pgs.
"U.S. Appl. No. 12/346,742, Final Office Action, mailed Sep. 19, 2011", 15 pgs.
"U.S. Appl. No. 12/346,742, Response filed Jun. 27, 2011 to Non Final Office Action, mailed Dec. 28, 2010", 12 pgs.

* cited by examiner

*Primary Examiner* — Liangche A Wang
(74) *Attorney, Agent, or Firm* — Schwegman, Lundberg & Woessner, P.A.

(57) ABSTRACT

A computer-implemented system and method for processing messages using pluggable protocol processors in a service-oriented pipeline architecture is disclosed. The method in an example embodiment includes receiving a message having a protocol-specific portion and a protocol-agnostic portion; determining a protocol compatible with the received message; activating one of a plurality of pluggable protocol processors compatible with the received message; processing the protocol-specific portion of the received message using the activated pluggable protocol processor; and processing the protocol-agnostic portion of the received message using a message processing pipeline, the message processing pipeline including a plurality of stages for processing the protocol-agnostic portion of the received message.

27 Claims, 5 Drawing Sheets

SYSTEM AND METHOD FOR PROCESSING MESSAGES USING PLUGGABLE PROTOCOL PROCESSORS IN A SERVICE-ORIENTED PIPELINE ARCHITECTURE

RELATED PATENT APPLICATION

This document is related to co-pending, commonly assigned, U.S. patent application Ser. No. 12/242,629, entitled "SYSTEM AND METHOD FOR PROCESSING MESSAGES USING A COMMON INTERFACE PLATFORM SUPPORTING MULTIPLE PLUGGABLE DATA FORMATS IN A SERVICE-ORIENTED PIPELINE ARCHITECHTURE", filed Sep. 30, 2008, incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

BACKGROUND

1. Technical Field

This disclosure relates to methods and systems supporting computing and data processing systems. More particularly, the disclosure relates to processing messages using pluggable protocol processors in a service-oriented pipeline architecture.

2. Related Art

In Services Oriented Architecture (SOA), there are typically many communicating reusable services that are deployed in several machines. In large-scale enterprises, like eBay, eTrade, or Google for example, there could be thousands of different services deployed in thousands of machines. It is most common and efficient for these services to communicate with each other. Further, external access is also typically provided for some of these services. In communicating with each other, various different types of communication protocols may be used for efficiently and optimization reasons. Communication between service providers and service consumers can be accomplished using some pre-defined protocol. In the web services case, this protocol can be the Simple Object Access Protocol (SOAP). SOAP is a protocol for exchanging Extensible Mark-up Language (XML)-based messages over computer networks, normally using Hypertext Transport Protocol (HTTP/HTTPS). SOAP often forms the foundation layer of the web services protocol stack providing a basic messaging framework upon which abstract layers can be built. There are several different types of messaging patterns in SOAP; but, by far the most common is the Remote Procedure Call (RPC) pattern, in which one network node (the client) sends a request message to another node (the server) and the server immediately sends a response message to the client.

Although SOAP can provide a communication or messaging protocol that can be used in some SOA implementations, sometimes there is a need for communicating using other protocols. For example, in some cases it may be beneficial or more efficient to use a proprietary protocol or some messaging protocol other than SOAP. When various different protocols are used, the SOA must either support all protocols and thereby become complex and inefficient, or the SOA is compatibility-restricted to operation only with one protocol. SOA's that support multiple protocols typically have different and independent message processing models. For example, an XML message received via SOAP in a conventional multi-protocol SOA is processed differently and independently from the processing performed on an XML message received via a protocol other than SOAP. Thus, the conventional multi-protocol SOA has some duplicated functionality and inefficiencies in the model and resource utilization.

U.S. Patent Application No. 2005/0223109 describes a system wherein services such as product services, real-time services, and common services are deployed in a services oriented architecture. These services may, for example, be deployed for use in a variety of enterprise data integration functions.

U.S. Patent Application No. 2007/0011126 describes a service-oriented architecture (SOA) and accompanying method. In one embodiment, the SOA includes one or more service requesters coupled to one or more service providers via a bus. The bus includes runtime-binding functionality to facilitate interaction between the one or more service requesters and the one or more service providers. A registry, which stores information pertaining to a service provided by the one or more service providers, communicates with one or more service providers and/or requesters and the bus. In a more specific embodiment, bus includes a Service-Integration Bus (SIB) that includes a Service-Factory (SF) module for facilitating implementing the runtime binding functionality and for selectively invoking the service. Functionality of the SOA is strategically organized into various tiers and layers, including a requester tier, a provider tier, a business-process services tier, an infrastructure-services tier, an SIB layer, a persistence layer, and so on.

U.S. Patent Application No. 2005/0267947 describes a system including a service bus, which can act as an intermediary between a client and a service. Messages to the service bus arrive on a transport and can be processed to determine a destination to route and/or publish the message to, a transformation to perform on the message, and/or security processing. The message is then sent out on a transport bound for a service or another service bus. A response to the message can follow an inverse path through the service bus.

Thus, a computer-implemented system and method for processing messages received via different protocols using pluggable protocol processors in a service-oriented pipeline architecture, are needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for processing messages using pluggable protocol processors in a service-oriented pipeline architecture. Various embodiments are described below in connection with the figures provided herein.

In particular, as depicted in the various figures included herewith, the SOA message processing model is independent of a specific protocol, as protocol-specific processing is made pluggable (e.g. processing modules can be added or removed without requiring a significant level of re-design or re-configuration). As such, duplicated functionality and inefficiencies in the SOA model and resource utilization can be avoided. Additionally, new protocols can be added to the SOA seamlessly without having to change the SOA processing model.

Figure 1:
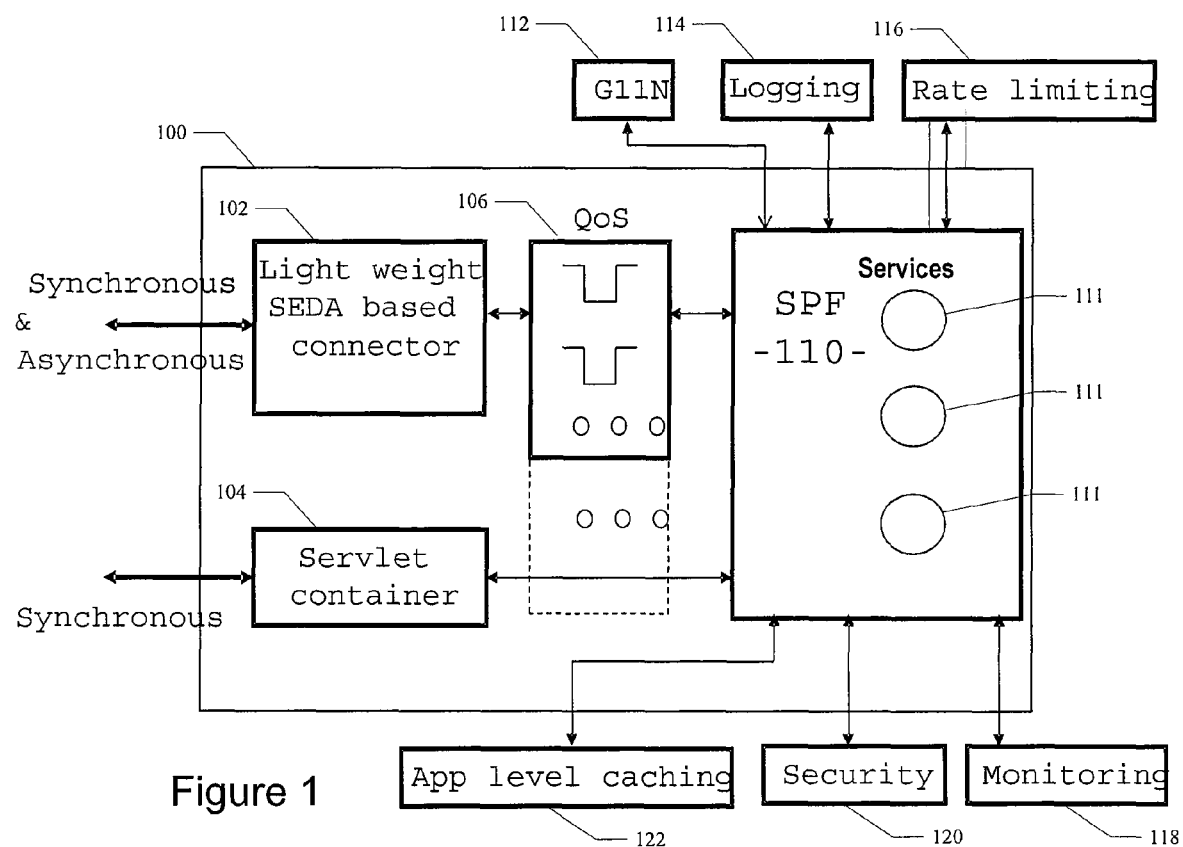
FIG. 1 illustrates an example embodiment of an overall message processing system for services within an Application Server.

Referring to FIG. 1, a diagram illustrates an example embodiment of a computer-implemented system for processing messages using pluggable protocol processors in a service-oriented pipeline architecture. In the example application server system 100 illustrated, synchronous or asynchronous messages are received and sent from system 100 either via a staged event-driven architecture (SEDA) interface 102 or a servlet interface 104 for transferring synchronous data streams. The staged event-driven architecture (SEDA) interface 102 decomposes a complex, event-driven software application into a set of stages connected by queues. This design avoids the high overhead associated with thread-based concurrency models, and decouples event and thread scheduling from application logic. By performing admission control on each event queue, the service can be well-conditioned to load, preventing resources from being overcommitted when demand exceeds capacity. SEDA employs dynamic control to automatically tune runtime parameters (such as the scheduling parameters of each stage) as well as to manage load, for example, by performing adaptive load shedding. Decomposing services into a set of stages also enables modularity and code reuse, as well as the development of debugging tools for complex event-driven applications. System 100 can also use a Quality of Service (QoS) module 106 to provide various levels of priority for the incoming message streams. Messages with higher levels of priority can be dispatched more quickly into the Service Provider Framework (SPF) 110 described in more detail below.

Figure 2:
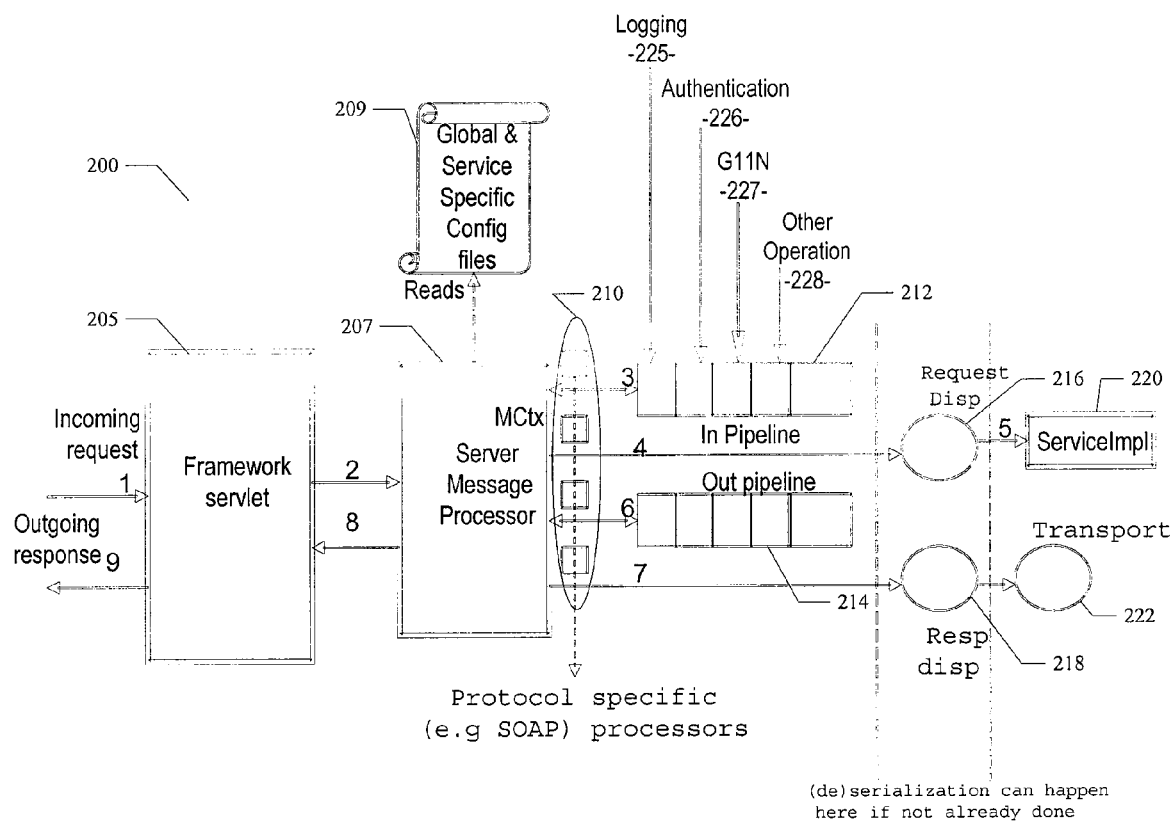
FIG. 2 illustrates an example embodiment of a server-side runtime environment or Service Provider Framework (SPF), using pluggable protocol processors
Figure 3:
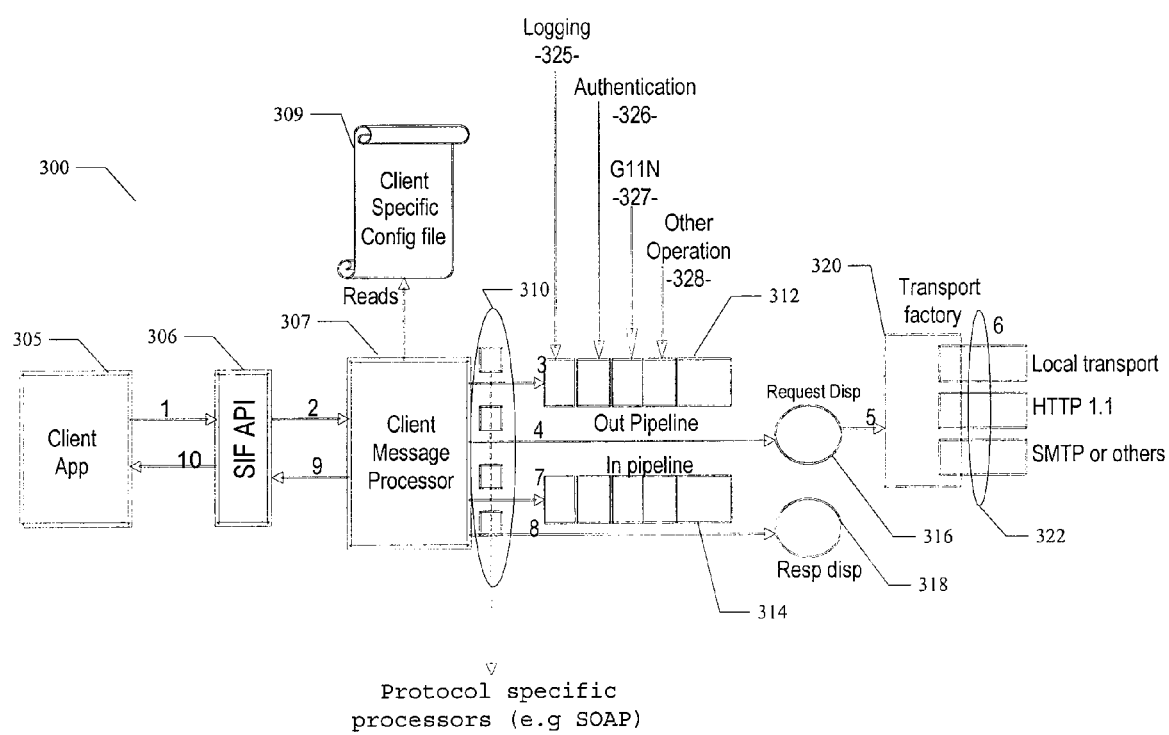
FIG. 3 illustrates an example embodiment of a client-side runtime environment or Service Invocation Framework (SIF), again using pluggable protocol processors

A Servlet is an object that receives a request and generates a response based on that request. A Servlet container is a specialized web server that supports Servlet execution. The Servlet container combines the basic functionality of a web server with certain Java/Servlet specific optimizations and extensions, such as an integrated Java runtime environment, and the ability to automatically translate specific Uniform Resource Locators (URLs) into Servlet requests. Individual Servlets are registered with a Servlet container, providing the container with information about what functionality they provide, and what URL or other resource locator they will use to identify themselves. The Servlet container is then able to initialize the Servlet as necessary and deliver requests to the Servlet as they arrive. Many containers have the ability to dynamically add and remove Servlets from the system, allowing new Servlets to quickly be deployed or removed without affecting other Servlets running from the same container. Servlet containers are also referred to as web containers or web engines. Servlet interface 104 can be implemented as a servlet container in a particular embodiment. Servlet interface 104 can process incoming synchronous messages and dispatch the processed messages into the Service Provider Framework (SPF) 110 described in more detail below. SPF 110 can receive messages, typically a service request, and after processing the messages in the manner described below, SPF 110 may dispatch the messages to an appropriate service 111. Prior to being dispatched to services 111, the incoming message can be initially processed by a number of modules in a pipelined architecture, each module performing a particular operation on the received message. These processing modules can include a G11N processing module 112. The term "G11N" as used herein refers to the operations of internationalization and localization. In computing, internationalization and localization (also spelled internationalisation and localisation) are means of adapting computer software for non-native environments, especially other nations and cultures. Internationalization is the conventional process of designing a software application so that it can be adapted to various languages and regions without engineering changes. Localization is the conventional process of adapting software for a specific region or language by adding locale-specific components and translating text. Due to their length, the terms are frequently abbreviated to G11N as shown in FIGS. 1-3. Another processing module of SPF 110 can be logging module 114. Logging module 114 is used to record various items of information related to the received message for tracking, debugging, and/or archiving purposes. Another processing module of SPF 110 can be rate limiting module 116. Rate limiting module 116 is used to adjust the flow of messages in a stream to a pre-defined rate limit or threshold. Application level caching module 122 of SPF 110 provides an ability to temporarily store application level information that may be accessed by the application more than once. Application level caching module 122 can provide a higher level of efficiency because the cached information does not need to be re-acquired through a network access. Security module 120 can be provided in SPF 110 to enforce a pre-defined security policy with respect to authentication and authorization. Finally, monitoring module 118 can be provided in SPF 110 to enable monitoring of the service invocation, consumption, status and subsequently to enable alerting conditions and monitoring of compliance with service level agreements (SLA's). All these are examples of some of the "handlers" in the pipeline that control the processing of the message. There are a number of other system level handlers. Service implementers can plug in their own service-specific handlers as needed. The list and order of handlers in the pipeline can be configured and customized as necessary, thus providing a true pluggable pipeline architecture with improved flexibility.

Messages received by system 100 can be configured for a variety of communication protocols. Although many SOA implementations use SOAP as a communications protocol, particular embodiments of system 100 can be used with a communication or messaging protocol that is either a proprietary protocol or some other standard messaging protocol other than SOAP. Most communication protocols for use with SOA implementations, whether SOAP or another protocol, typically use a common basic messaging structure. In general, this messaging structure consists of a message header followed by a message payload or message body. In most cases, the message header contains most of the protocol-specific data. The message payload typically contains data content that is generally common (or can be made common) for all supported communication protocols. For this reason, particular embodiments can isolate protocol-specific message processing into a set of relatively compact protocol-specific message processors—one for each protocol supported by system 100. As will be described in more detail below, the protocol-specific message processors can be 'plugged in' or added to the system 100 architecture without a significant level of re-design or re-configuration of the system. Portions of the incoming message that are common to all supported protocols can be efficiently processed in a message pipeline of SPF 110 as described below. Because the portions of the incoming message processed by the message pipeline of SPF 110 are protocol-agnostic (i.e. not protocol specific), the insertion of a new or different protocol-specific message processor does not affect (and therefore does not require modification to) the message pipeline of SPF 110. In this manner, the embodiments described herein can support a variety of communication protocols in an SOA implementation without causing system re-designs or redundancies. These pluggable protocol processors can be registered in a configuration file. In this manner, various pluggable protocol processors can be conveniently added (i.e. plugged into) or removed from the message pipeline of SPF 110 without significant effort.

Referring now to FIG. 2, a particular example embodiment of a server-side runtime environment or Service Provider Framework (SPF) 200 is illustrated. SPF 200 can receive incoming messages from a requester server via a framework servlet 205. The incoming messages can be a server request for a service supported by the SOA. Messages received by SPF 200 can be configured for a variety of different communication protocols. Framework servlet 205 can handle the receipt, and queuing of the incoming messages, including initialization of appropriate modules. After initial processing, the framework servlet 205 forwards the incoming message to a server message processor 207.

Server Message Processor (SMP) 207 is the main driver for processing the incoming message. At its initialization time, SMP 207 reads all the service configuration files 209 and initializes the appropriate modules, service implementation instances, and any special handlers, etc. Handlers are processing logic components that are plugged into the pipeline in the manner described above. The handlers act on the message, typically just the header portion of the message. Examples of these handlers include security, logging, etc. as shown in FIG. 1 and described above. Service configuration files 209, in a particular example embodiment, are hierarchical and are consist of three levels—Global, group, and instance specific. The global configuration file is used to configure things that are common to all services in the deployed environment. The group level configuration file is used to configure things that are common to a group of services (e.g., a specific domain like Search or Trading etc.). The Instance specific configuration file is used to configure things that are specific only to a particular service. The configuration system of SMP 207 allows configuration of much of the functionality provided by system 200. For example, handlers, desired data formats, and protocol processors can all be configured by SMP 207. The SMP 207 manages the processing of the received message through several different, but symmetric processing steps. These processing steps include: processing a request message using the In Pipeline 212, dispatching the processed request message through a request dispatcher 216, processing a response message using the Out Pipeline 214, and dispatching the processed response message through a response dispatcher 218. At each of these steps, the appropriate protocol processor that matches (e.g. is compatible with) the protocol of the incoming message, is also invoked. If any errors occur at any state of processing, the processing flow is intercepted by the Server Message Processor (SMP) 207 and an appropriate error message is returned. The error message can be sent through the Out Pipeline 214 and response dispatcher 218. Thus, SMP 207 is the main driver for the message processing performed in system 200.

As part of the processing operations performed by the server message processor 207, the message header of the incoming message can be decoded to determine the particular protocol for which the incoming message is coded (or compatible with). Once the specific protocol corresponding to the incoming message is determined, a corresponding one of the protocol-specific-processors 210 can be activated to operate upon the header of the incoming message of the same or compatible protocol type. As mentioned above, the specific protocol processor 210 is invoked at each of the processing steps performed by the SMP 207. The specific protocol processor 210 processes the protocol-specific headers (e.g. SOAP envelope, in the case of SOAP) and a context is maintained to reflect the processed information. This context is also made available to the pipeline 212, in case any handler wants to look at the context. Once the specific protocol processor 210 returns, then the message is passed through the input/request pipeline 212. The protocol-agnostic portion of the incoming message (e.g. message payload and transport headers) is run through the input pipeline 212 for staged processing. In a particular embodiment, the pipeline 212 can include several stages. For example, a first stage of pipeline 212 can be a logging stage 225 for handling logging of the incoming message. Logging stage 225 can be used to generate a record for the received message. A second stage of pipeline 212 can be an authentication stage 226 for handling authentication operations on the incoming message. Various types and degrees of message authentication can be implemented at this stage. A third stage of pipeline 212 can be a G11N stage 227 for handling the operations of internationalization and localization on the incoming message. As described above, internationalization and localization operations can be used to regionalize a message so appropriate results are produced. Other stages can be added to pipeline 212 to enable the insertion of one or more pluggable processors for handling a variety of data formats and for decoding a message payload coded in a particular data format. It will be apparent to those of ordinary skill in the art upon reading this disclosure that other stages can similarly be added to pipeline 212 in which other operations 228 could similarly be performed on the protocol-agnostic portions of the incoming message. Further, because of the pipeline architecture of the described embodiment, various stages of the pipeline can be performed in parallel thereby increasing efficiency of the system 100.

Once the protocol-agnostic portion of the incoming message is processed by each of the stages of pipeline 212, the message can be dispatched to a corresponding service implementation module 220 via a request dispatcher 216. At the point where the incoming message is passed to the request dispatcher 216, de-serialization of the message payload is performed, if de-serialization has not already been performed by one of the stages in pipeline 212. It is beneficial to push de-serialization of the message payload to the later stages of processing; because, de-serialization can be a time-consuming and expensive process. The service implementation module 220 can then perform the requested service based on the service request.

As the service implementation module 220 generates output in response to the request for service, server message processor 207 can perform post-processing on the protocol-agnostic portion of the output data using an output pipeline 214. In a manner similar to input pipeline 212, output pipeline 214 can be divided into stages, each stage performing an operation on the protocol-agnostic portion of the output data. Once the protocol-agnostic portion of the output data is processed by each of the stages of pipeline 214, the protocol-specific portion of the output data is processed by the one of the protocol-specific processors 210. At this point, the output message, which can either be an output data message generated in response to the service request or an error message, can be dispatched to a transport module 222 via the response dispatcher 218. Transport module 222 can deliver the output message to a service requester via a selected transport medium/protocol. In the case of a synchronous communication, the transport module may simply return to the SMP 207, which in turn returns the response to the servlet container.

Referring now to FIG. 3, a particular example embodiment of a client-side runtime environment or Service Invocation Framework (SIF) 300 is illustrated. SIF 300 can receive incoming messages from a client application requester 305 via an SIF application programming interface (API) 306 or through a pre-generated proxy. The incoming messages can be a client request for a service supported by the SOA. A client message processor 307 receives the incoming message either way.

The Client Message Processor (CMP) 307, in a particular example embodiment, is the main driver for processing the outgoing request message and for handling the received response. This is very much equivalent to the SMP 207 on the server side. The CMP 307 performs processing operations similar to the SMP 207; however, the CMP 307 operates on the client side. These processing operations, as described above, include running the request message through the request pipeline (Out pipeline 312), request dispatcher 316, response pipeline (In pipeline 314) and response dispatcher 318. Similar to the processing performed on the server side, an appropriate protocol-specific processor 310 is also invoked at each of these processing steps to formulate a request message that contains the selected protocol-specific envelope. Similarly, an appropriate protocol-specific processor 310 is also invoked for processing of the protocol-specific envelope in the response message as well. Again, similar to the server side, the client side also uses a hierarchy of configuration files, such as global, group and instance-specific configurations. As described above, the CMP 307 is responsible for managing these configurations.

As part of the processing operations performed by the client message processor 307, the message header of the outgoing message needs to be encoded to reflect the selected protocol. To do this, a corresponding one of the protocol-specific message processors 310 is activated to encode the header of the outgoing message of the same or compatible protocol type. Once the specific protocol processor 310 returns, the outgoing message is run through the request pipeline (Out pipeline 312) for staged processing of the protocol-agnostic portion of the message. In a particular embodiment, the pipeline 312 can include several stages. For example, a first stage of pipeline 312 can be a logging stage 325 for handling logging of the incoming message. Logging stage 325 can be used to generate a record for the received message. A second stage of pipeline 312 can be an authentication stage 326 for inserting the security credentials, authentication coding, and the like. As many stages can be added to pipeline 312 as necessary to enable customization of message processing. In fact, every portion of processing logic can be added as a stage (also referred to as a Handler) in the pipeline 312. Further, because of the pipeline architecture of the described embodiment, various stages of the pipeline can be performed in parallel thereby increasing efficiency of the system 100.

Once the protocol-agnostic portion of the outgoing message is processed by each of the stages of pipeline 312, the request message is dispatched to a transport factory module 320 via a request dispatcher 316. The request dispatcher 316 serializes the outgoing message into the wire data format that is selected/configured, before handing off the message to the transport factory module 320. The transport factory module 320 delegates transport of the message via one of a plurality of pluggable transport processors 322. A particular embodiment can offer support for a plurality of transport modes and protocols, such as a local transport (useful when the client and server are deployed in the same Java Virtual Machine—JVM), Hypertext Transport Protocol (HTTP), Simple Mail Transfer Protocol (SMTP), and the like. The transport factory module 320 sends the request message to the server via the respective one of the pluggable transport processors 322. The particular pluggable transport processor 322 chosen for transport of the request message can be configured by the CMP 307. It will be apparent to those of ordinary skill in the art upon reading this disclosure that other specific transport modes/protocols can similarly be added to transport factory 320 to enable transport of the processed request message in a variety of ways.

As the service implementation (on the server side) generates output in response to the request for service, the transport factory module 320 receives this response and passes control to the client message processor 307. Client message processor then invokes the appropriate protocol-specific processor 310 for processing the protocol-specific portion of the response message. The CMP 307 then runs the response message through the response pipeline (In pipeline) 314. In a manner similar to request pipeline 312, response pipeline 314 is also divided into stages, each stage performing an operation on the protocol-agnostic portion of the incoming response data. At this point, the incoming response message, which can be output data in response to a service request, is dispatched to a response dispatcher 318. Additionally, the client message processor 307 can send a response to the client application requester 305 via the SIF API 306.

Figure 4:
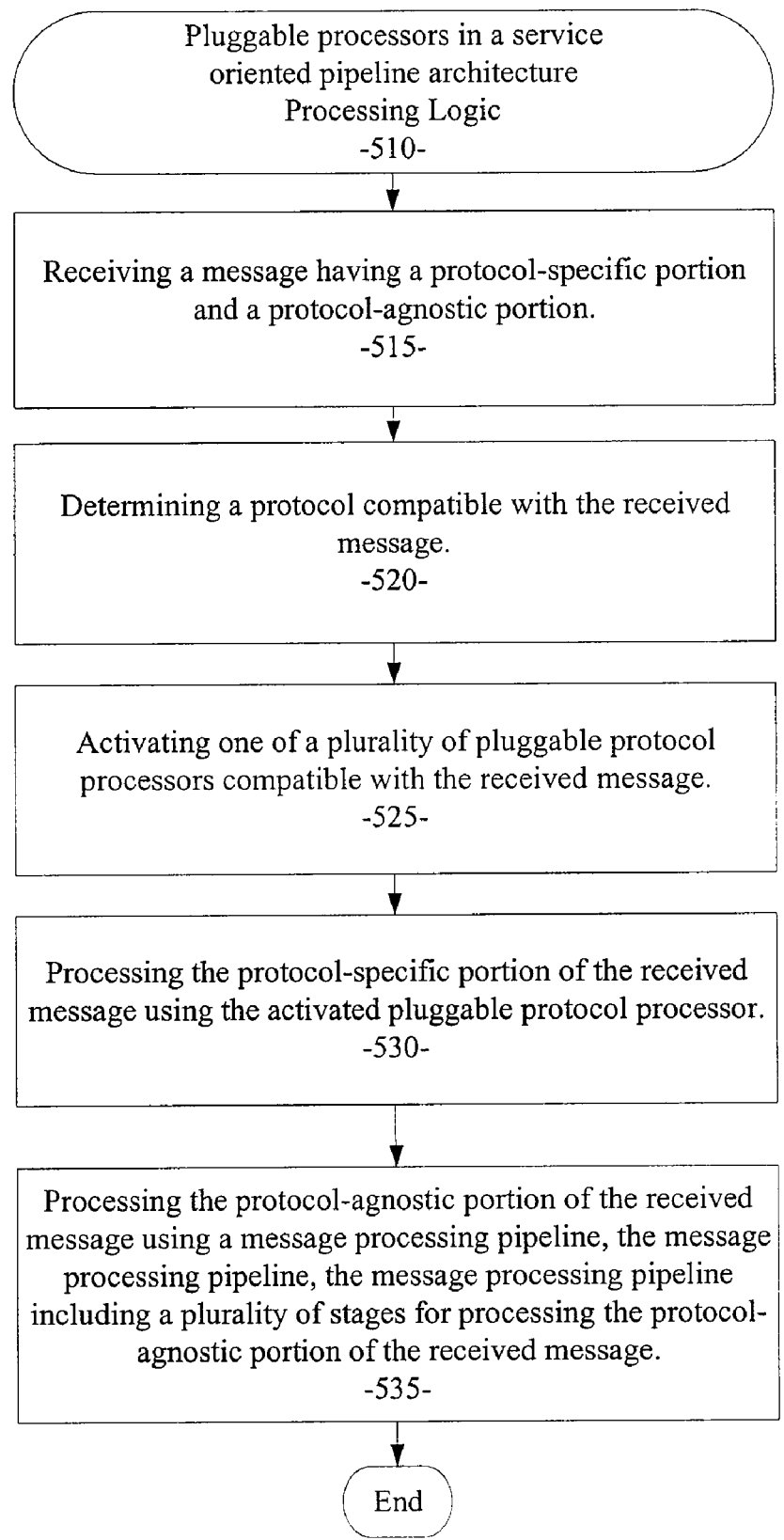
FIG. 4 illustrates a processing flow diagram for an example embodiment.

FIG. 4 illustrates a processing flow diagram for an example embodiment. In the embodiment 510 shown, an apparatus for processing messages using pluggable protocol processors in a service-oriented pipeline architecture performs the processing operations of: receiving a message having a protocol-specific portion and a protocol-agnostic portion (processing block 515); determining a protocol compatible with the received message (processing block 520); activating one of a plurality of pluggable protocol processors compatible with the received message (processing block 525); processing the protocol-specific portion of the received message using the activated pluggable protocol processor (processing block 530); and processing the protocol-agnostic portion of the received message using a message processing pipeline, the message processing pipeline including a plurality of stages for processing the protocol-agnostic portion of the received message (processing block 535).

An apparatus of an example embodiment for processing messages using pluggable protocol processors in a service-oriented pipeline architecture includes: a message processor to receive a message having a protocol-specific portion and a protocol-agnostic portion, the message processor to determine a protocol compatible with the received message; a plurality of pluggable protocol processors coupled to the message processor, at least one of the plurality of pluggable protocol processors being compatible with the received message, the pluggable protocol processor being compatible with the received message being operable to process the protocol-specific portion of the received message; and a message processing pipeline to process the protocol-agnostic portion of the received message, the message processing pipeline including a plurality of stages for processing the protocol-agnostic portion of the received message. A similar example apparatus performs similar processing operations on the client (i.e., request sending side) side of the framework.

Figure 5:
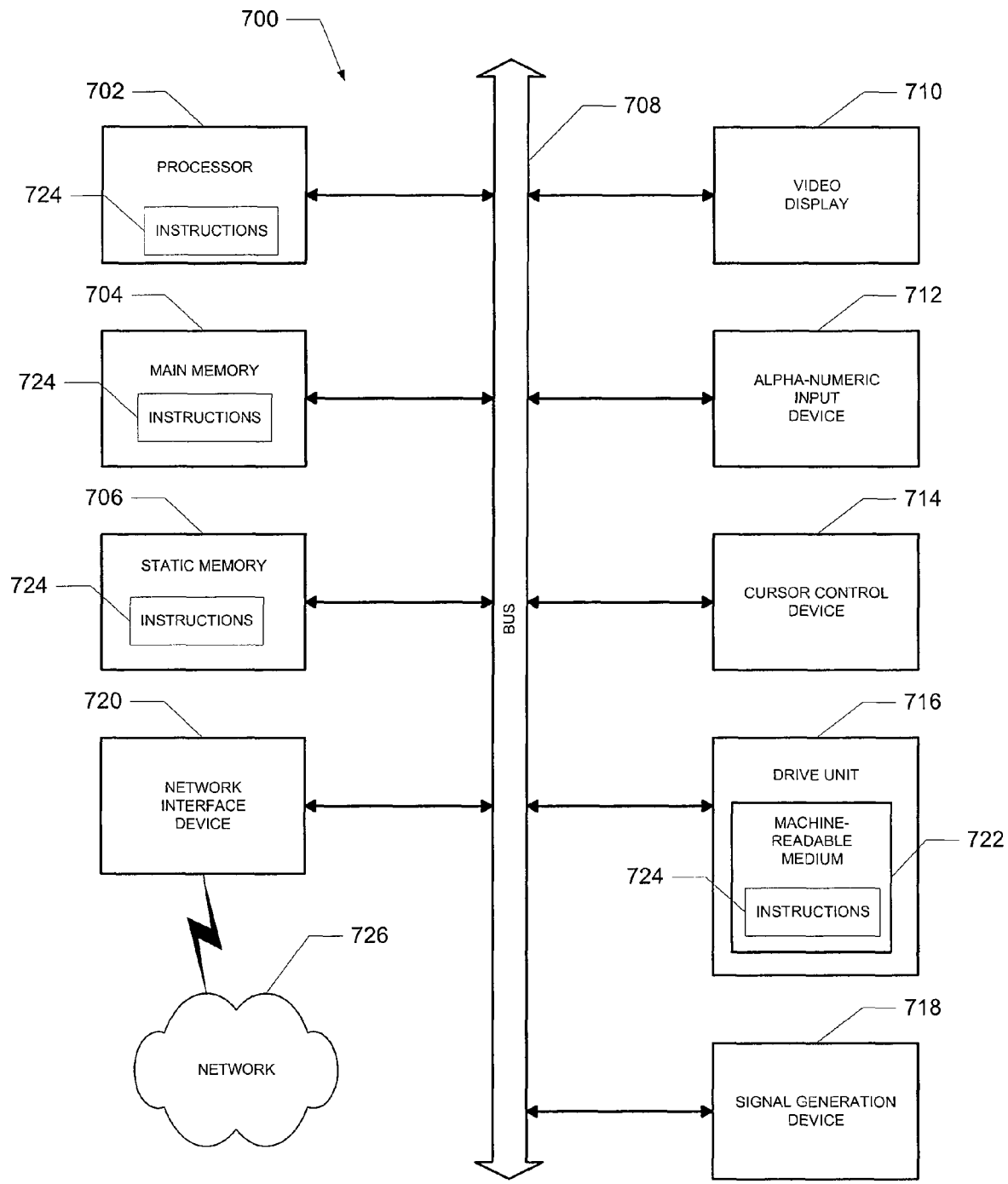
FIG. 5 shows a diagrammatic representation of a machine in the form of a computer system within which a set of instructions, for causing the machine to perform any one or more of the methodologies discussed herein, may be executed, according to an example embodiment.

FIG. 5 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for processing messages using pluggable protocol processors in a service-oriented pipeline architecture are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
receiving a message having a protocol-specific portion and a protocol-agnostic portion;
determining a protocol compatible with the received message;
activating one of a plurality of pluggable protocol processors compatible with the received message;
processing the protocol-specific portion of the received message using the activated pluggable protocol processor;
processing the protocol-agnostic portion of the received message using a message processing pipeline, the message processing pipeline including a plurality of stages for processing the protocol-agnostic portion of the received message, the message processing pipeline providing processing independent of the pluggable protocol processor; and
dispatching the received message to a corresponding service implementation module.

2. The method as claimed in claim 1 wherein the protocol-specific portion of the received message is a message header.

3. The method as claimed in claim 1 wherein the protocol-agnostic portion of the received message is a message payload.

4. The method as claimed in claim 1 wherein one example of a protocol is the Simple Object Access Protocol (SOAP).

5. The method as claimed in claim 1 wherein the plurality of stages of the message processing pipeline includes a logging stage.

6. The method as claimed in claim 1 wherein the plurality of stages of the message processing pipeline includes an authentication stage.

7. The method as claimed in claim 1 wherein the plurality of stages of the message processing pipeline includes an internationalization and localization stage.

8. The method as claimed in claim 1 wherein the plurality of stages of the message processing pipeline includes a specific data format decoding stage.

9. The method as claimed in claim 1 wherein the plurality of stages of the message processing pipeline includes other processing operations not including specific data format decoding, internationalization and localization, authentication, or logging.

10. The method as claimed in claim 1 including combining the protocol-specific portion of the received message as processed by the activated pluggable protocol processor with the protocol-agnostic portion of the received message as processed by the message processing pipeline to produce a processed message.

11. The method as claimed in claim 10 including passing the processed message to a transport factory having a plurality of pluggable transport processors.

12. The method as claimed in claim 11 wherein the plurality of pluggable transport processors includes at least one pluggable transport processor from the group: local transport processor, Hypertext Transport Protocol (HTTP) processor, and Simple Mail Transfer Protocol (SMTP) processor.

13. An apparatus comprising:
a data processor;
a message processor, executable by the data processor, to receive a message having a protocol-specific portion and a protocol-agnostic portion, the message processor to determine a protocol compatible with the received message;
a plurality of pluggable protocol processors coupled to the message processor, at least one of the plurality of pluggable protocol processors being compatible with the received message, the pluggable protocol processor being compatible with the received message being operable to process the protocol-specific portion of the received message;
a message processing pipeline to process the protocol-agnostic portion of the received message, the message processing pipeline including a plurality of stages for processing the protocol-agnostic portion of the received message, the message processing pipeline providing processing independent of the pluggable protocol processor; and
a service implementation module for performing a service requested by the received message.

14. The apparatus as claimed in claim 13 wherein the protocol-specific portion of the received message is a message header.

15. The apparatus as claimed in claim 13 wherein the protocol-agnostic portion of the received message is a message payload.

16. The apparatus as claimed in claim 13 wherein an example of a protocol is the Simple Object Access Protocol (SOAP).

17. The apparatus as claimed in claim 13 wherein the plurality of stages of the message processing pipeline includes a logging stage.

18. The apparatus as claimed in claim 13 wherein the plurality of stages of the message processing pipeline includes an authentication stage.

19. The apparatus as claimed in claim 13 wherein the plurality of stages of the message processing pipeline includes an internationalization and localization stage.

20. The apparatus as claimed in claim 13 wherein the plurality of stages of the message processing pipeline includes a specific data format decoding stage.

21. The apparatus as claimed in claim 13 wherein the plurality of stages of the message processing pipeline includes other processing operations not including specific data format decoding, internationalization and localization, authentication, or logging.

22. The apparatus as claimed in claim 13 being further configured to combine the protocol-specific portion of the received message as processed by the compatible pluggable protocol processor with the protocol-agnostic portion of the received message as processed by the message processing pipeline to produce a processed message.

23. The apparatus as claimed in claim 22 further including a transport factory, coupled to the message processor, the transport factory having a plurality of pluggable transport processors, wherein one of the plurality of pluggable transport processors is used to transport the processed message.

24. The apparatus as claimed in claim 23 wherein the plurality of pluggable transport processors includes at least one pluggable transport processor from the group containing: local transport processor, Hypertext Transport Protocol (HTTP) processor, and Simple Mail Transfer Protocol (SMTP) processor.

25. An article of manufacture comprising a non-transitory machine-readable storage medium having machine executable instructions embedded thereon, which when executed by a machine, cause the machine to:

receive a message having a protocol-specific portion and a protocol-agnostic portion;

determine a protocol compatible with the received message;

activate one of a plurality of pluggable protocol processors compatible with the received message;

process the protocol-specific portion of the received message using the activated pluggable protocol processor;

process the protocol-agnostic portion of the received message using a message processing pipeline, the message processing pipeline including a plurality of stages for processing the protocol-agnostic portion of the received message, the message processing pipeline providing processing independent of the pluggable protocol processor; and dispatch the received message to a corresponding service implementation module.

26. The article of manufacture as claimed in claim 25 wherein the protocol-specific portion of the received message is a message header.

27. The article of manufacture as claimed in claim 25 wherein the protocol-agnostic portion of the received message is a message payload.

* * * * *

UNITED STATES PATENT AND TRADEMARK OFFICE
CERTIFICATE OF CORRECTION

| | | |
|---|---|---|
| PATENT NO. | : 8,135,785 B2 | Page 1 of 1 |
| APPLICATION NO. | : 12/242639 | |
| DATED | : March 13, 2012 | |
| INVENTOR(S) | : Sastry K. Malladi et al. | |

It is certified that error appears in the above-identified patent and that said Letters Patent is hereby corrected as shown below:

In column 1, line 14, delete "ARCHITECHTURE" and insert -- ARCHITECTURE --, therefor.

In column 2, line 62, after "processors" insert -- . --.

In column 2, line 65, after "processors" insert -- . --.

Signed and Sealed this
Twelfth Day of June, 2012

David J. Kappos
*Director of the United States Patent and Trademark Office*